United States Patent
Guo et al.

(10) Patent No.: US 9,904,092 B2
(45) Date of Patent: Feb. 27, 2018

(54) LIQUID CRYSTAL DISPLAY PANEL USING DISCOTIC LIQUID CRYSTAL TO INDUCE ALIGNMENT OF NEMATIC LIQUID CRYSTAL AND MANUFACTURING METHOD THEREOF

(71) Applicant: BEIJING BOE OPTOELECTRONICS TECHNOLOGY CO., LTD., Beijing (CN)

(72) Inventors: Renwei Guo, Beijing (CN); Dong Chen, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 13/824,526

(22) PCT Filed: Nov. 7, 2012

(86) PCT No.: PCT/CN2012/084245
§ 371 (c)(1),
(2) Date: Mar. 18, 2013

(87) PCT Pub. No.: WO2013/131379
PCT Pub. Date: Sep. 12, 2013

(65) Prior Publication Data
US 2014/0111760 A1    Apr. 24, 2014

(30) Foreign Application Priority Data

Mar. 8, 2012 (CN) .......................... 2012 1 0060315

(51) Int. Cl.
*G02F 1/1334* (2006.01)
*G02F 1/1337* (2006.01)
(Continued)

(52) U.S. Cl.
CPC ............ *G02F 1/1334* (2013.01); *C09K 19/32* (2013.01); *G02F 1/1337* (2013.01);
(Continued)

(58) Field of Classification Search
USPC ........................................................... 349/86
See application file for complete search history.

(56) References Cited

U.S. PATENT DOCUMENTS

| 6,497,928 B1 | 12/2002 | Sato et al. |
| 2002/0047980 A1 | 4/2002 | Jun et al. |

(Continued)

FOREIGN PATENT DOCUMENTS

| CN | 1641425 A | 7/2005 |
| CN | 101131436 A | 2/2008 |

(Continued)

OTHER PUBLICATIONS

First Chinese Office Action dated Feb. 8, 2014; Appln. No. 201210060315.6.
(Continued)

*Primary Examiner* — Lauren Nguyen
(74) *Attorney, Agent, or Firm* — Ladas & Parry LLP

(57) ABSTRACT

Embodiments of the present invention disclose a liquid crystal display panel and a manufacturing method thereof. The liquid crystal display panel comprises two substrates disposed opposite to each other and a liquid crystal layer filled between the two substrates, and the liquid crystal layer is formed from a mixture, comprising discotic liquid crystal, nematic liquid crystal and photoinitiator, by UV-light irradiation; the mixture comprises 5%~50% by mass of discotic liquid crystal, 40~90% by mass of nematic liquid crystal, and 0.05%~10% by mass of photoinitiator. The liquid crystal panel can have reduced response time.

9 Claims, 6 Drawing Sheets

(51) Int. Cl.
*G02F 1/139* (2006.01)
*C09K 19/32* (2006.01)
*C09K 19/04* (2006.01)
*G02F 1/137* (2006.01)

(52) U.S. Cl.
CPC .... *G02F 1/1393* (2013.01); *C09K 2019/0429* (2013.01); *C09K 2019/0448* (2013.01); *G02F 2001/13345* (2013.01); *G02F 2001/13775* (2013.01)

(56) References Cited

U.S. PATENT DOCUMENTS

| | | | |
|---|---|---|---|
| 2002/0080305 A1* | 6/2002 | Choi et al. | 349/88 |
| 2003/0039770 A1 | 2/2003 | Sato et al. | |
| 2005/0200800 A1* | 9/2005 | Makimoto et al. | 349/187 |
| 2007/0108408 A1* | 5/2007 | Kumar | C09K 19/02 252/299.61 |
| 2008/0055521 A1 | 3/2008 | Mizutani et al. | |
| 2009/0290100 A1* | 11/2009 | Haruta | C08J 5/18 349/75 |
| 2010/0103358 A1* | 4/2010 | Gibbons et al. | 349/130 |

FOREIGN PATENT DOCUMENTS

| | | |
|---|---|---|
| CN | 102354081 A | 2/2012 |
| CN | 102645778 A | 8/2012 |
| JP | 2001-354965 A | 12/2001 |
| JP | 2005035985 A | 2/2005 |
| KR | 20020031251 A | 5/2002 |
| KR | 1020050091909 A | 9/2005 |
| KR | 1020070035296 A | 3/2007 |
| KR | 20080018853 A | 2/2008 |

OTHER PUBLICATIONS

International Search Report; Feb. 28, 2013; PCT/CN2012/084245.
Korean Office Action Appln. No. 10-2013-7010707; dated Aug. 29, 2014.
International Preiirninary Report on Patentability dated Sep. 9, 2014; PCT/CN2012/084245.
Second Chinese Office Action dated Oct. 16, 2014; Appln. No. 201210060315.6.
Korean Office Action dated Feb. 26, 2015; Appln. No. 10-2013-7010101.
Third Chinese Office Action dated Feb. 12, 2015; Appln. No. 201210060315.6.
Walter Caseri, et al; "Rompp-Enzyklopedie-Photoinitiatoren", Dec. 2007, XP002742364, Retrieved from the Internet: URL:https://roempp.thieme.de/roempp4.0/do/data/RD-16-02061 [retrieved on Jul. 16, 2015].
Harold F. Krug, et al; "Rompp-Enzyklopedie-Konzentration", Aug. 2008, XP002742471, Retrieved from the Internet: URL:https://roempp.thieme.de/roempp4.0/do/data/RD-11-01868 [retrieved on Jul. 20, 2015].
Hiroyuki Kamiya(1) et al: "56.3: Development of One Drop Fill Technology for AM-LCDs", 2001 SID International Symposium—Jun. 3-8, 2001, San Jose Convention Center, California, vol. XXXIII, Jun. 3, 2001, p. 1354, XP007007798.
Extended European Search Report dated Jul. 15, 2015; Appln. No. 12830909.3-1904/2653914 PCT/CN2012084245.
Korean Office Action dated Aug. 26, 7015; Appln. No. 10-2013-7010101.
Korean Notice of Allowance Appln. No. 10-2013-7010101; dated Oct. 31, 2015.
EPO Office Action dated Mar. 28, 2017; Appln. No. 12830909.3-1914.

\* cited by examiner

LIQUID CRYSTAL DISPLAY PANEL USING DISCOTIC LIQUID CRYSTAL TO INDUCE ALIGNMENT OF NEMATIC LIQUID CRYSTAL AND MANUFACTURING METHOD THEREOF

TECHNICAL FIELD

Embodiments of the present invention relate to a liquid crystal display panel and a manufacturing method thereof.

BACKGROUND

Depending on the requirements for different display modes, in a liquid crystal display using nematic liquid crystal, the alignment of the nematic liquid crystal between substrates has different manors. Generally, there are two alignment manors of nematic liquid crystal: nematic liquid crystal planar-alignment mode and nematic liquid crystal vertical-alignment mode.

When the display mode is TN (twisted nematic, (orientation of liquid crystal molecules form a 90-degree twist)), STN (super twisted nematic, a 180-degree twisted nematic), IPS (in-plane switching), FFS (fringe field switching) or the like, a planar-aligning method is adopted to induce the alignment of nematic liquid crystal. For example, a preparation method is as follows.

1. An alignment layer is formed, by applying an aligning agent (for example, polyimide (PI) or polyvinyl alcohol (PVA)) on a surface of a substrate.
2. The alignment layer on a substrate surface is dried.
3. The substrate surface having the alignment layer is rubbed after the drying process, so that a plurality of microgrooves are formed on the substrate having the alignment layer.
4. Nematic liquid crystal is added dropwise on the substrate formed with grooves, and then a liquid crystal layer is sandwiched between two substrates after a liquid crystal cell is formed. Under the action of the alignment layer formed on the substrates, the nematic liquid crystal molecules are induced in an alignment.

When the display mode is MVA (multi-domain vertical-alignment), a different aligning agent may be adopted to induce the alignment of nematic liquid crystal. A preparation method for that aligning agent is substantially the same as the planar-aligning method; siloxane may be elected as the aligning agent for vertical-alignment; the silicone is applied on a substrate surface and then dried; silicone adheres to the substrate by chemical bonds, and the flexible chain groups at ends of siloxane are capable of inducing nematic liquid crystal in an arrangement perpendicular to the substrate.

The above are two common aligning methods for liquid crystal; they both achieve liquid crystal alignment through treatment onto a substrate surface. The alignment mechanism is that, by inducing the alignment of the liquid crystal which is close to a surface of an alignment layer, the nematic liquid crystal within the entirety of a liquid crystal cell is caused to be arranged. However, the alignment layer applied on a substrate has less action on the liquid crystal molecules far away from the alignment layer, so that the aligning action on the liquid crystal molecules is non-uniform, thereby affecting liquid crystal display effect.

SUMMARY

Embodiments of the present invention provide a liquid crystal display panel and a manufacturing method thereof for making the alignment of the nematic liquid crystal within a liquid crystal cell and far away from an alignment layer uniform with the alignment of the nematic liquid crystal close to the alignment layer, and thereby reducing the response speed of the liquid crystal panel.

One aspect of the present invention provides a liquid crystal display panel, comprising: two substrates disposed opposite to each other and a liquid crystal layer filled between the two substrates, in which the liquid crystal layer is formed from a mixture, comprising discotic liquid crystal, nematic liquid crystal and photoinitiator, by UV (Ultraviolet)-light irradiation; and the mixture comprises 5~50% by mass of discotic liquid crystal, 40~90% by mass of nematic liquid crystal, and 0.05~10% by mass of photoinitiator.

In this liquid crystal panel, for example, the mass percentage of discotic liquid crystal is 5~10%.

In this liquid crystal panel, for example, the photoinitiator is one or more substances from dibenzoyl peroxide, lauroyl peroxide, azobisisobutyronitrile, azobisisoheptonitrile, diisopropyl peroxydicarbonate, or dicyclohexyl peroxydicarbonate.

Another aspect of the present invention further provides a manufacturing method for a liquid crystal display panel, the method comprising:

forming an alignment layer by applying an aligning agent on at least one of two substrates used for manufacture of a liquid crystal panel;

mixing discotic liquid crystal, nematic liquid crystal and photoinitiator and stirring with protection from light to obtain a mixture;

adding dropwise the mixture on the substrate formed with the alignment layer, and then performing cell-assembling with protection from light; and irradiating the substrates after cell-assembling with UV-light, so that the discotic liquid crystal is polymerized under action of the photoinitiator to form a discotic liquid crystal polymer network.

In this method, for example, the UV-light wavelength is 350 nm~390 nm; the UV-light irradiation time duration is 1~180 minutes; and the UV-light irradiation intensity is 0.1~100 mW/cm$^2$.

For example, before the mixture is added dropwise on the substrate applied with the aligning agent, the method further comprises: the mixture is defoamed for 1~20 hours, with protection from light.

In this method, for example, in the mixture, the mass percentage of nematic liquid crystal is 40~90%, the mass percentage of discotic liquid crystal is 5~50%, and the mass percentage of photoinitiator is 0.05~10%. In this method, for example, the mass percentage of discotic liquid crystal is 5~10%.

In this method, for example, the photoinitiator is one or more substances selected from dibenzoyl peroxide, lauroyl peroxide, azobisisobutyronitrile, azobisisoheptonitrile, diisopropyl peroxydicarbonate, and dicyclohexyl peroxydicarbonate.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical jargon or scientific terms used herein should be interpreted in the usual sense as understood by those ordinary skilled in the relevant art of the present invention. The terms "first", "second", and the like, used in the specification and claims of this patent application of the invention, do not denote any order, quantity, or importance, but are used to distinguish among different integral parts. Similarly, the terms "a", "an", "the" and the like, herein do not denote a limitation of quantity, but rather denote the presence of at least one of the referenced item. The phases "connection" or "connected" or the like, are not limited to physical or mechanical connections, but may comprise electrical connection, whether direct or indirect. The phases "on", "under", "left", "right" and the like, are only used to indicate a relative positional relationship, which may be correspondingly changed as an absolute position of a described object is changed.

Figure 1:
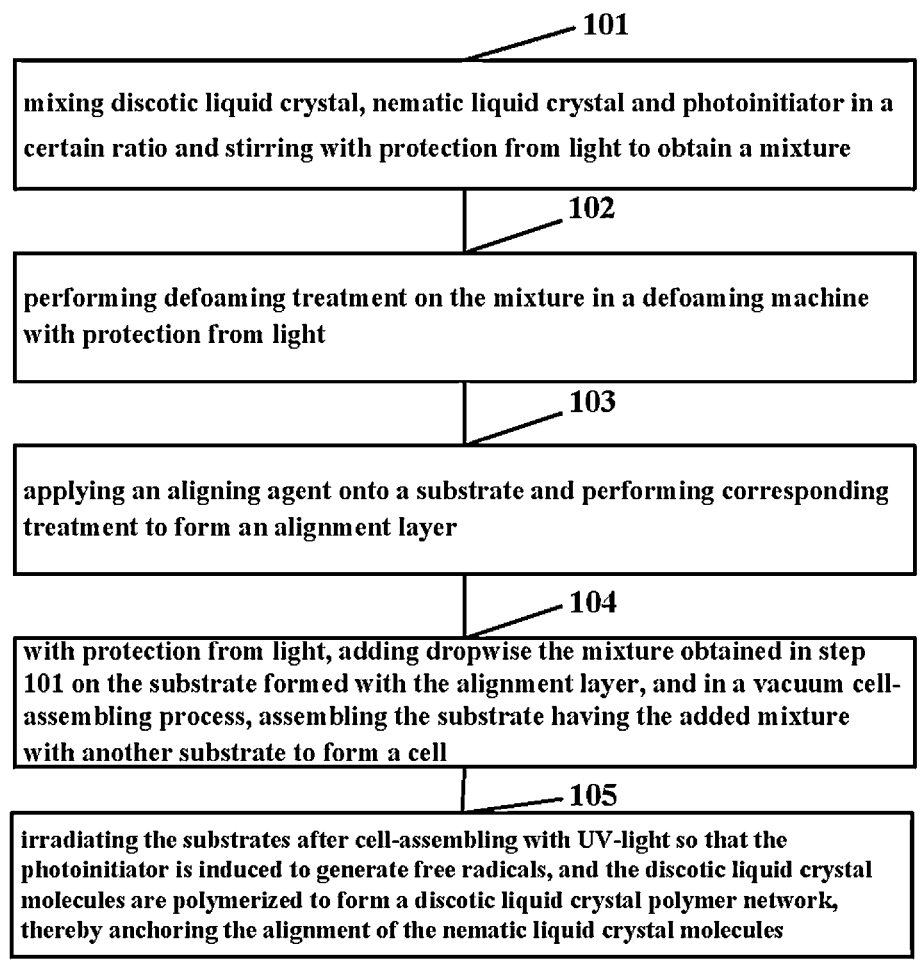
FIG. 1 is a schematic flowchart of a manufacturing method for a liquid crystal display panel according to the present invention.

As shown in FIG. 1, it is a schematic flowchart of a manufacturing method for a liquid crystal display panel provided by the present invention. The manufacturing method for a liquid crystal display panel comprises steps as follows.

Step 101: mixing discotic liquid crystal, nematic liquid crystal and photoinitiator in a certain ratio and stirring with protection from light to obtain a mixture.

Here, "a certain ratio" refers to the case in which, in the mixture, the mass percentage of nematic liquid crystal may be 40~90%, the mass percentage of discotic liquid crystal may be 5~50%, and the mass percentage of photoinitiator may be 0.05~10%, as long as the purpose and technical effect of the present invention can be achieved.

The nematic liquid crystal may be a kind of commonly used liquid crystal currently available in the market, which is typically a mixture of liquid single-crystal which is composed of 20-30 parts by mass. The photoinitiator is, for example, benzoin anisole or the like.

The reason for this and subsequent steps to be operated with protection from light is that, when photoinitiator is mixed in the liquid crystal, UV component in light will activate the photoinitiator to act and thus lead to polymerization. Therefore, the condition of "with protection from light" can be met, provided that polymerization induced by light can be avoided.

Preferably, the mass percentage of discotic liquid crystal is selected as 5~10%.

The photoinitiator generally may choose dibenzoyl peroxide, lauroyl peroxide, azobisisobutyronitrile, azobisisoheptonitrile, diisopropyl peroxydicarbonate, or dicyclohexyl peroxydicarbonate, or the like.

Because discotic liquid crystal has a unique disc-like molecular structure and is strongly miscible with nematic liquid crystal, discotic liquid crystal has fluidity in nematic liquid crystal; moreover, by stirring the mixture, discotic liquid crystal and nematic liquid crystal can be better mutually-miscible, so that a relatively stable solution is formed.

Step 102: performing defoaming treatment on the mixture in a defoaming machine with protection from light.

The duration of the defoaming treatment may be 1~20 hours.

Step 103: applying an aligning agent onto a substrate and performing corresponding treatment to form an alignment layer.

The alignment layer thus formed will undergo treatments for aligning liquid crystal. A process for the treatments comprises: drying and rubbing, etc.

Depending on the different required orientations for the alignment of nematic liquid crystal, a different kind of aligning agents may be chosen. For example, if it is required that nematic liquid crystal is aligned parallel to the substrate, then the aligning agent may be polyimide (PI), polyvinyl alcohol (PVA), etc.; if it is required that nematic liquid crystal is aligned perpendicular to the substrate, then the aligning agent may be siloxane, etc.

The substrate may be an array substrate and/or a substrate disposed opposite to an array substrate (for example, a CF (color filter) substrate).

Step 104: with protection from light, adding dropwise the mixture obtained in step 101 on the substrate formed with the alignment layer, and in a vacuum cell-assembling process, assembling the substrate having the added mixture with another substrate to form a cell.

The vacuum cell-assembling process refers to the process in which, under a certain vacuum condition (under reduced pressure), two substrates, which are used for forming a liquid crystal panel, are disposed opposite to each other and form a liquid crystal cell with sealant.

Figure 3A:
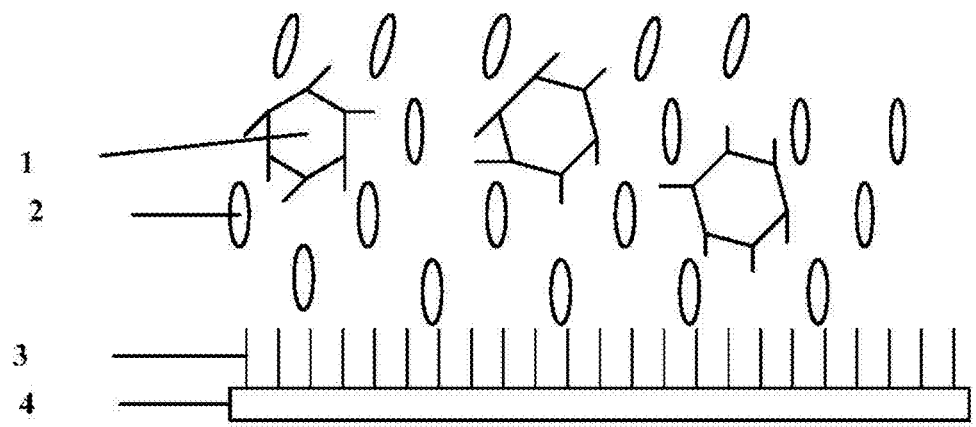
FIG. 3(a) is a schematic structural diagram of a liquid crystal display panel according to the present invention, under the action of a vertical-aligning agent and before UV-light irradiation.
Figure 4A:
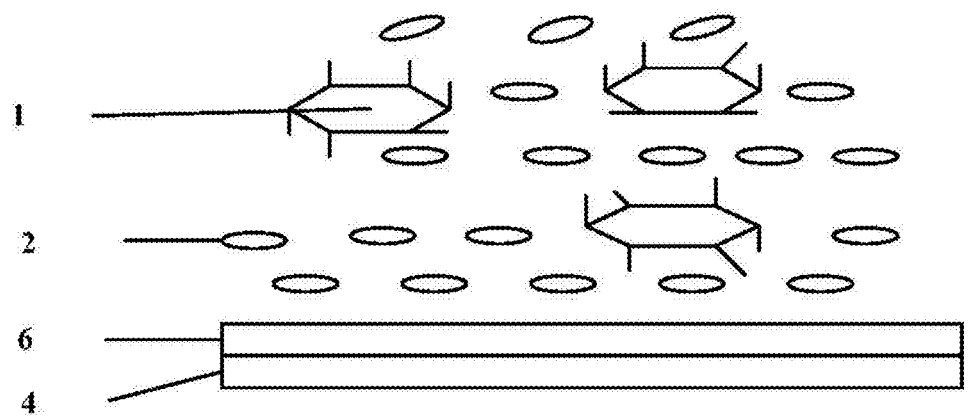
FIG. 4(a) is a schematic structural diagram of a liquid crystal display panel according to the present invention, under the action of a planar-aligning agent and before UV-light irradiation.

As the inner surface of a substrate of the liquid crystal cell after cell-assembling is formed with the alignment layer, the layer can induce the alignment of the nematic liquid crystal in the mixture, and the plane-direction of the main "discs" of the discotic liquid crystal molecules is parallel to the long-axis direction of nematic liquid crystal. In other words, when the aligning agent is siloxane, a vertical-alignment layer 3 is formed on the surface of the substrate 4, the nematic liquid crystal 2 is aligned perpendicular to the substrate 4, and at this time the planes of the discotic liquid crystal molecules 1 are also perpendicular to the substrate 4; when the aligning agent is polyimide (PI), polyvinyl alcohol (PVA), a horizontal-alignment layer 6 is formed on the surface of the substrate 4, the nematic liquid crystal 2 is aligned parallel to the substrate 4, and at this time the planes of the discotic liquid crystal molecules 1 are also parallel to the substrate 4, as shown in FIG. 3(a) and FIG. 4(a).

It also should be noted that, the implementation process of this step 104 should be operated with protection from light.

Step 105: irradiating the substrates after cell-assembling with UV-light so that the photoinitiator is induced to generate free radicals, and the discotic liquid crystal molecules 1 are polymerized to form a discotic liquid crystal polymer network 5, thereby anchoring the alignment of the nematic liquid crystal molecules 2.

Figure 3B:
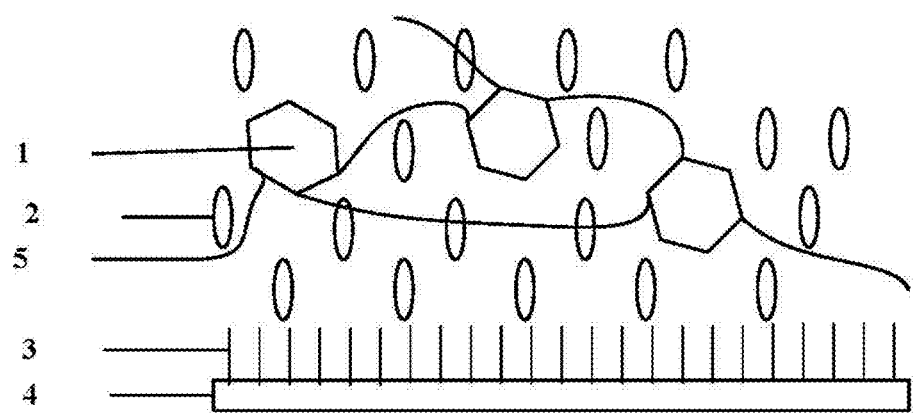
FIG. 3(b) is a schematic structural diagram of a liquid crystal display panel according to the present invention, under the action of a vertical-aligning agent and after UV-light irradiation.
Figure 4B:
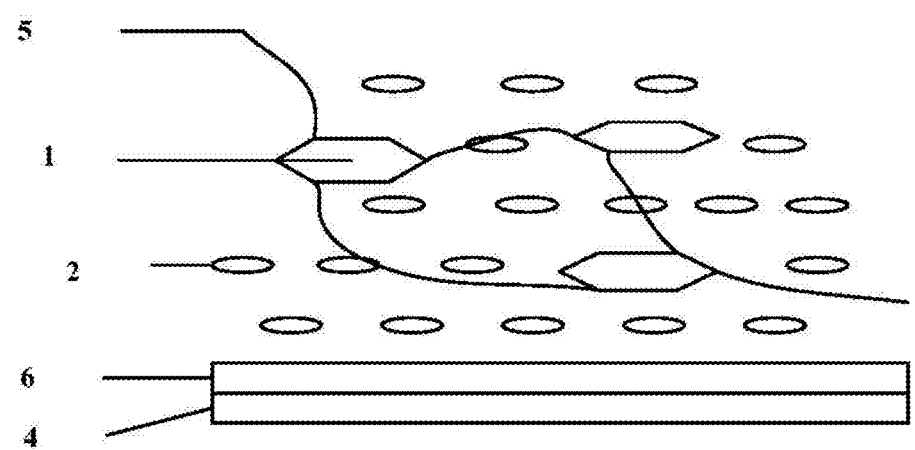
FIG. 4(b) is a schematic structural diagram of a liquid crystal display panel according to the present invention, under the action of a planar-aligning agent and after UV-light irradiation.
Figure 5:
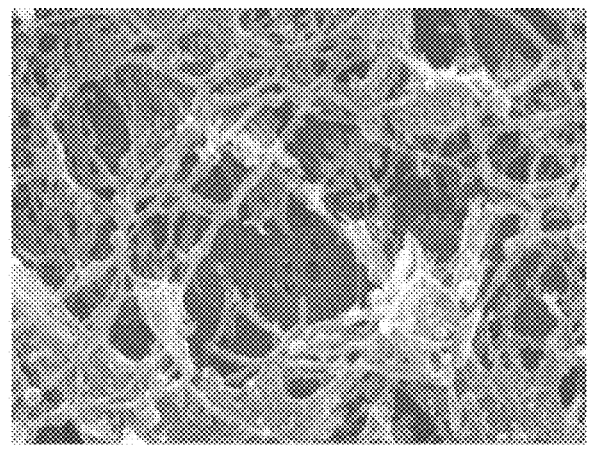
FIG. 5 is an electron-micrograph of a polymer network after polymerization of discotic liquid crystal.

FIG. 3(b) and FIG. 4(b) show schematic structural diagrams of a liquid crystal layer after UV-light irradiation; as can be seen, the discotic liquid crystal 1 in the mixture, under the action of the free radicals generated from the photoinitiator due to the induction of the UV irradiation, is polymerized and thus forms a polymer network 5. Due to the action of the polymer network 5, the location of the discotic liquid crystal in the liquid crystal cell is fixed, so that the nematic liquid crystal 2 is aligned vertically or planarly in accordance with the discotic liquid crystal, thereby anchoring the alignment of the nematic liquid crystal, and making the alignment of the nematic liquid crystal within the liquid crystal cell uniform.

It should be noted that, the basic conditions of the UV-light irradiation may be as follows. The UV-light wavelength is selected from the range of 350 nm~390 nm, and usually the UV-light wavelength is selected as 365 nm; the UV-light irradiation time duration is 1~180 minutes; and the UV-light irradiation intensity is 0.1~100 mW/cm$^2$.

In this embodiment, branch chains, which contain double-bond functional groups, are introduced onto the disc-like molecules of the discotic liquid crystal; under the action of the free radicals, the double-bond functional groups on the discotic liquid crystal molecules are polymerized, forming a discotic liquid crystal polymer network. The polymer network is a spatial network structure, which can fix the location of the main "discs" of the discotic liquid crystal in the liquid crystal cell, and cause the nematic liquid crystal to be aligned in accordance with the planes of the discotic liquid crystal.

Figure 2:
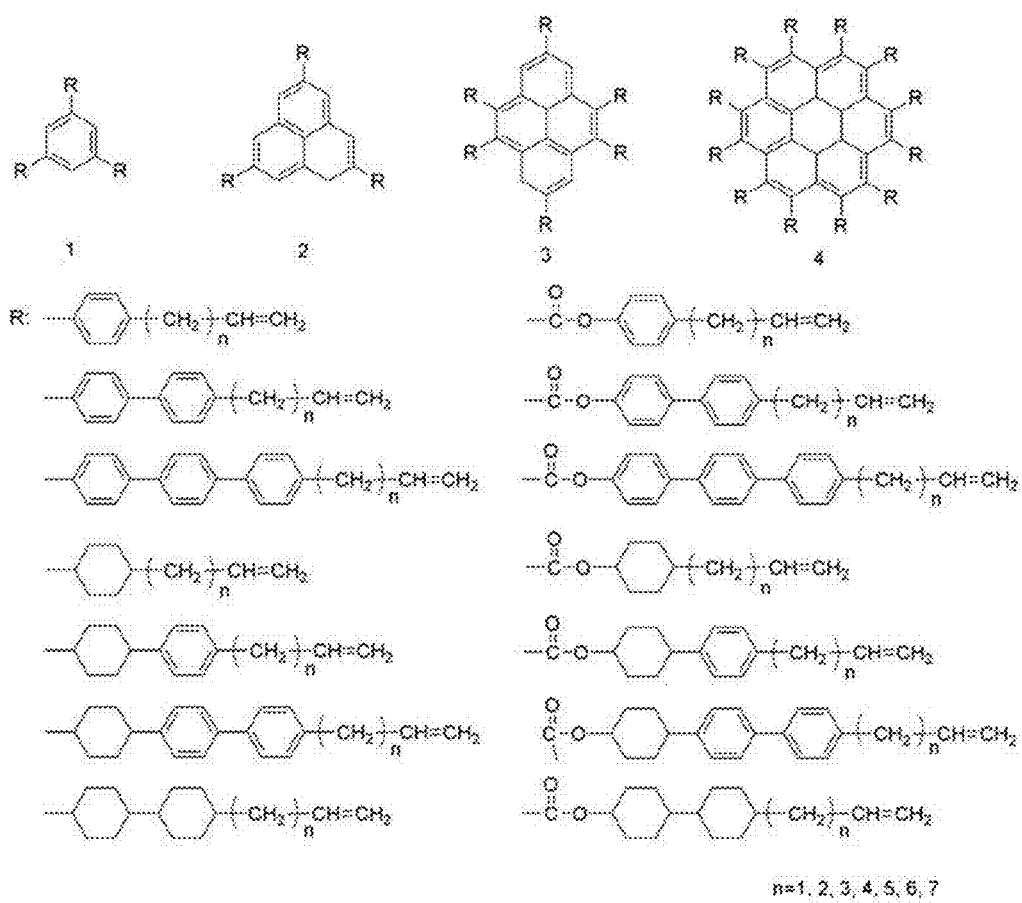
FIG. 2 is a structural diagram of benzene-ring(s) in common discotic liquid crystal molecules.

Discotic liquid crystal is composed of main "discs" and branch chains; when the structure of the main "discs" in the discotic liquid crystal is different, after polymerization, the effect on the induced alignment of the nematic liquid crystal is accordingly different. The larger the number of benzene-ring(s) in the main "discs", the greater the effect on the induced alignment of the nematic liquid crystal. FIG. 2 is a structural diagram of the main "discs" in common discotic liquid crystal molecules; as can be seen from FIG. 2, the number of Benzene-ring(s) in the main "discs" may be 1, 3, 4 and 7; however, the number of Benzene-ring(s) in the main "discs" of the discotic liquid crystal molecules that can be employed in this embodiment is not limited thereto.

Furthermore, the content of the discotic liquid will affect the effect on the induced-arrangement of the nematic liquid crystal; the general rule is: at a less the content the discotic liquid crystal is, the sparser the polymer network generated after polymerization is, and in turn a worse effect of the induced alignment of the nematic liquid crystal is incurred; at a more content of the discotic liquid crystal content is, the denser the polymer network generated after polymerization is, and in turn a better effect of the induced alignment of the nematic liquid crystal. However, when the content of the discotic liquid crystal is too high, the solubility of the discotic liquid crystal in the nematic liquid crystal molecules will be degraded, and this will consequently suppress the alignment of the nematic liquid crystal. Accordingly, when discotic liquid crystal, nematic liquid crystal and photoinitiator are mixed in a certain ratio, the mass percentage of discotic liquid crystal is 5~50%, and preferably may be 5~10%.

Figure 6A:
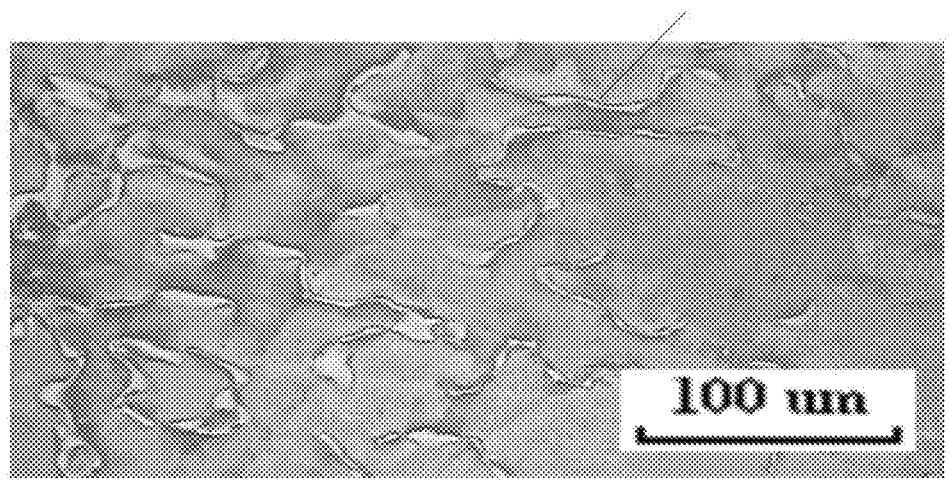
FIG. 6(a) is a polarization photograph of nematic liquid crystal, which is not in an alignment by induced discotic liquid crystal.
Figure 6B:
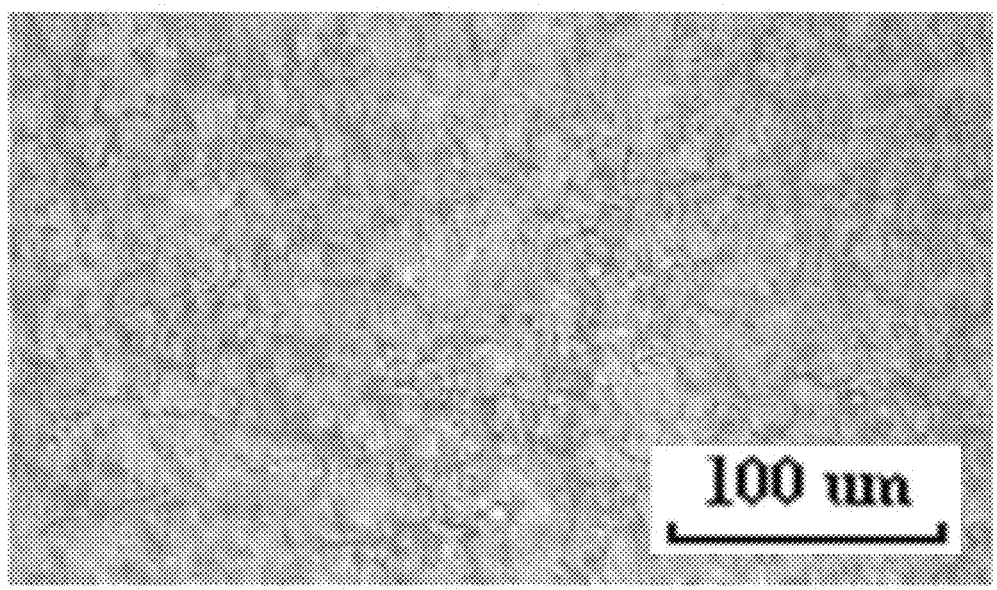
FIG. 6(b) is a polarization photograph of nematic liquid crystal in a planar-alignment induced by discotic liquid crystal.
Figure 6C:
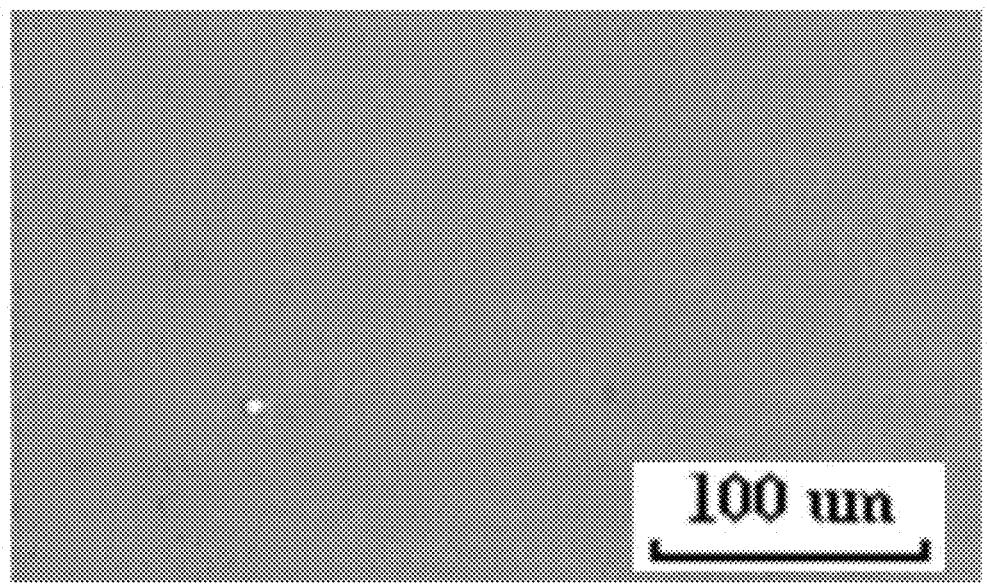
FIG. 6(c) is a polarization photograph of nematic liquid crystal in a vertical-alignment induced by discotic liquid crystal.

It should be noted that, when the mass percentage of discotic liquid crystal is 5~10%, the effect on the alignment of the nematic liquid crystal is best, as shown in FIG. 6(b) and FIG. 6(c); as can be seen from the comparison of FIG. 6(b)-6(c) with FIG. 6(a), there is an obvious schlieren structure in FIG. 6(a), while in FIG. 6(b) and FIG. 6(c), due to the addition of discotic liquid crystal, the schlieren structure disappears, which indicates that, under the action of the discotic liquid crystal polymer network, the alignment of the nematic liquid crystal tends to be uniform.

In addition, when the structure of the branched-chains in the discotic liquid crystal molecules is different, the mechanical properties of the generated polymer network are also different. The larger the number of discotic liquid crystal molecules having benzene-ring(s) or naphthalene-ring(s) contained in the branch chains thereof is, the stronger rigidity and the better mechanical properties of the generated polymer network possesses; the larger the number of discotic liquid crystal molecules having ester-groups contained in the branch chains thereof is, the weaker rigidity and the worse mechanical properties of the generated polymer network possesses.

Furthermore, the number of the double-bond functional groups contained in the branch chains of the discotic liquid crystal will affect the rate of polymerization of the discotic liquid crystal. The smaller the number of double-bond functional groups contained in the branch chains of the discotic liquid crystal is, the slower polymerization rate the discotic liquid crystal has under the action of UV-light and photoinitiator; the larger the number of double-bond functional groups contained in the branch chains of the discotic liquid crystal is, the faster polymerization rate the discotic liquid crystal has under the action of UV-light and photoinitiator.

First Embodiment

In this embodiment, in the above-described step 101, the mass percentage of discotic liquid crystal is 6%, the mass percentage of photoinitiator is 1%, and the mass percentage of nematic liquid crystal is 93%; and the mixture, obtained in such a proportion through step 101 to step 105, can anchor the nematic liquid crystal, thereby making the alignment of the nematic liquid crystal uniform within a liquid crystal cell.

Second Embodiment

In this embodiment, in the above-described step 101, the mass percentage of discotic liquid crystal is 8%, the mass percentage of photoinitiator is 2%, and the mass percentage of nematic liquid crystal is 90%; and the mixture, obtained in such a proportion through step 101 to step 105, can anchor the nematic liquid crystal, thereby making the alignment of the nematic liquid crystal uniform within a liquid crystal cell.

Third Embodiment

In this embodiment, in the above-described step 101, the mass percentage of discotic liquid crystal is 5%, the mass percentage of photoinitiator is 2%, and the mass percentage of nematic liquid crystal is 93%; and the mixture, obtained in such a proportion through step 101 to step 105, can anchor the nematic liquid crystal, thereby making the alignment of the nematic liquid crystal uniform within a liquid crystal cell.

Fourth Embodiment

In this embodiment, in the above-described step 101, the mass percentage of discotic liquid crystal is 9%, the mass percentage of photoinitiator is 3%, and the mass percentage of nematic liquid crystal is 88%; and the mixture, obtained in such a proportion through step 101 to step 105, can anchor the nematic liquid crystal, thereby making the alignment of the nematic liquid crystal uniform within a liquid crystal cell.

Fifth Embodiment

In this embodiment, in the above-described step 101, the mass percentage of discotic liquid crystal is 10%, the mass percentage of photoinitiator is 6%, and the mass percentage of nematic liquid crystal is 84%; and the mixture, obtained in such a proportion through step 101 to step 105, can anchor the nematic liquid crystal, thereby making the alignment of the nematic liquid crystal uniform within a liquid crystal cell.

The above give out five preferred embodiments of the present invention. In the present solution, discotic liquid crystal, nematic liquid crystal and photoinitiator are mixed in a certain ratio and added dropwise on the substrate formed with an alignment layer, then vacuum cell-assembling is performed; thereafter, under the action of UV-light irradiation, the discotic liquid crystal is enabled to generate a polymer network, thereby anchoring the alignment of the nematic liquid crystal, so that the alignment of the nematic liquid crystal relatively far away from the alignment layer can be uniform with the alignment of the nematic liquid crystal close to the alignment layer, and thus the response time of the liquid crystal panel display can be reduced.

The above description involves only illustrative examples of the present invention, but is not used for limiting the scope of the invention; instead, the scope of the invention should be defined by the appended claims.

The invention claimed is:

1. A manufacturing method for a liquid crystal display panel, comprising:
    forming an alignment layer by applying an aligning agent on at least one of two substrates adapted for manufacture of a liquid crystal panel;
    mixing discotic liquid crystal, nematic liquid crystal and photoinitiator and stirring with protection from light to obtain a mixture in which the discotic liquid crystal and the nematic liquid crystal are mutually-miscible at ambient temperature in the absence of additional solvent(s);
    adding dropwise the mixture onto the substrate formed with the alignment layer, with protection from light, and then performing cell-assembling with protection from light; and
    irradiating the substrates after cell-assembling with UV-light, so that the discotic liquid crystal is polymerized under action of the photoinitiator to form a discotic liquid crystal polymer network,
    wherein, in the mixture, the mass percentage of nematic liquid crystal is 40-90%, the mass percentage of discotic liquid crystal is 6-9%, and the mass percentage of photoinitiator is 0.05-10%; and
    in the mixture, a plane-direction of main discs of the discotic liquid crystal is parallel to a long-axis direction of the nematic liquid crystal.

2. The manufacturing method for a liquid crystal display panel according to claim 1, wherein the UV-light wavelength is 350 nm~390 nm; the UV-light irradiation time duration is 1~180 minutes; and the UV-light irradiation intensity is 0.1~100 mW/cm$^2$.

3. The manufacturing method for a liquid crystal display panel according to claim 1, wherein the mixture is defoamed with protection from light before the mixture is added dropwise on the substrate applied with the aligning agent.

4. The manufacturing method for a liquid crystal display panel according to claim 1, wherein the photoinitiator is dibenzoyl peroxide, lauroyl peroxide, azobisisobutyronitrile, azobisisoheptonitrile, diisopropyl peroxydicarbonate, or dicyclohexyl peroxydicarbonate.

5. The manufacturing method for a liquid crystal display panel according to claim 2, wherein the mixture is defoamed with protection from light before the mixture is added dropwise on the substrate applied with the aligning agent.

6. The manufacturing method for a liquid crystal display panel according to claim 2, wherein the photoinitiator is dibenzoyl peroxide, lauroyl peroxide, azobisisobutyronitrile, azobisisoheptonitrile, diisopropyl peroxydicarbonate, or dicyclohexyl peroxydicarbonate.

7. The manufacturing method for a liquid crystal display panel according to claim 3, wherein the photoinitiator is dibenzoyl peroxide, lauroyl peroxide, azobisisobutyronitrile, azobisisoheptonitrile, diisopropyl peroxydicarbonate, or dicyclohexyl peroxydicarbonate.

8. A liquid crystal display panel, comprising: two substrates disposed opposite to each other and a liquid crystal layer filled between the two substrates, wherein the liquid crystal layer is formed from a mixture, comprising discotic liquid crystal, nematic liquid crystal and photoinitiator, by UV-light irradiation;
    the mixture comprises 6%~9% by mass of discotic liquid crystal, 40~90% by mass of nematic liquid crystal, and 0.05%~10% by mass of photoinitiator; and the discotic liquid crystal and the nematic liquid crystal are mutually-miscible in the mixture at ambient temperature in the absence of additional solvent(s); and
    in the liquid crystal layer, a plane-direction of main discs of the discotic liquid crystal is parallel to a long-axis direction of the nematic liquid crystal.

9. The liquid crystal panel according to claim 8, wherein the photoinitiator is one or a mixture of two or more substances selected from dibenzoyl peroxide, lauroyl peroxide, azobisisobutyronitrile, azobisisoheptonitrile, diisopropyl peroxydicarbonate, and dicyclohexyl peroxydicarbonate.

\* \* \* \* \*